United States Patent
Dettinger et al.

(10) Patent No.: US 7,949,685 B2
(45) Date of Patent: May 24, 2011

(54) MODELING AND IMPLEMENTING COMPLEX DATA ACCESS OPERATIONS BASED ON LOWER LEVEL TRADITIONAL OPERATIONS

(75) Inventors: Richard D. Dettinger, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 12/025,077

(22) Filed: Feb. 4, 2008

(65) Prior Publication Data
US 2008/0147648 A1    Jun. 19, 2008

Related U.S. Application Data

(62) Division of application No. 10/682,133, filed on Oct. 9, 2003, now Pat. No. 7,822,767.

(51) Int. Cl.
*G06F 7/00* (2006.01)

(52) U.S. Cl. ........................................ 707/802

(58) Field of Classification Search .................. 707/791, 707/802, 999.101
See application file for complete search history.

(56) References Cited

U.S. PATENT DOCUMENTS

| | | | |
|---|---|---|---|
| 5,412,804 A | 5/1995 | Krishna | |
| 5,734,887 A | 3/1998 | Kingberg et al. | |
| 5,774,128 A * | 6/1998 | Golshani et al. | 345/440 |
| 6,434,545 B1 | 8/2002 | MacLeod et al. | |
| 6,567,802 B1 * | 5/2003 | Popa et al. | 1/1 |
| 6,578,046 B2 | 6/2003 | Chang et al. | |
| 6,725,227 B1 | 4/2004 | Li | |
| 6,785,668 B1 | 8/2004 | Polo et al. | |
| 6,829,600 B2 | 12/2004 | Gu et al. | |
| 7,010,529 B2 | 3/2006 | Klein et al. | |
| 7,016,903 B1 | 3/2006 | Thusoo et al. | |
| 7,092,955 B2 * | 8/2006 | Mah et al. | 1/1 |
| 7,133,871 B2 * | 11/2006 | Sluiman | 1/1 |
| 7,630,986 B1 * | 12/2009 | Herz et al. | 1/1 |
| 2002/0078015 A1 | 6/2002 | Ponnekanti | |
| 2003/0028511 A1 * | 2/2003 | Sluiman | 707/1 |
| 2003/0037039 A1 * | 2/2003 | Mah et al. | 707/1 |
| 2003/0126136 A1 | 7/2003 | Omoigui | |
| 2004/0267719 A1 | 12/2004 | Doherty et al. | |
| 2005/0080765 A1 * | 4/2005 | Dettinger et al. | 707/3 |
| 2010/0030741 A1 * | 2/2010 | Johnson et al. | 707/3 |

\* cited by examiner

*Primary Examiner* — Kimberly Lovel
*Assistant Examiner* — Mohammed R Uddin
(74) *Attorney, Agent, or Firm* — Patterson & Sheridan, LLP

(57) ABSTRACT

A system, method and article of manufacture for data processing and, more particularly, for managing execution of complex data access operations in a data processing system. One embodiment provides a method of managing execution of query operations in a data processing system. The method comprises issuing, by a requesting entity, a request to perform a composite query operation defining an initial query operation and a subsequent query operation to be executed against a data repository of the data processing system, executing the initial query operation, determining an operation status of the initial query operation, and managing execution of the subsequent query operation on the basis of the determined operation status.

14 Claims, 6 Drawing Sheets

MODELING AND IMPLEMENTING COMPLEX DATA ACCESS OPERATIONS BASED ON LOWER LEVEL TRADITIONAL OPERATIONS

CROSS-REFERENCE TO RELATED APPLICATIONS

This is a divisional of U.S. patent application Ser. No. 10/682,133 filed Oct. 9, 2003 now U.S. Pat. No. 7,822,767; which is herein incorporated by reference.

BACKGROUND OF THE INVENTION

1. Field of the Invention

The present invention generally relates to data processing and, more particularly, to managing execution of complex data access operations in a data processing system.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user) to retrieve, add, modify and delete information being stored and managed by the DBMS. Standard database access methods support these operations using high-level query languages, such as the Structured Query Language (SQL).

The term "query" denominates a set of commands that cause execution of operations for retrieving data from a stored database. SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

One difficulty when dealing with SQL query operations is the implementation of more complex data access operations. More specifically, while the SQL query operations achieve good performance when being run as single query operations, there is often a need for a requesting entity to perform more complex data access operations. Such complex data access operations generally go beyond the functions provided by the single SQL operations. An exemplary complex operation is an operation that will first attempt an update operation and then perform an insert operation if the data to update is not already present. Another exemplary complex operation will first perform a delete operation to delete an existing set of data before inserting new (replacement) data. Still another exemplary complex operation is an operation that will first retrieve and copy a set of existing data to be used as input to an insert operation which inserts the copied data into the database.

One approach consists in implementing such complex data access operations using a combination of more basic single query operations. To this end, the requesting entity (e.g., an application) developers need to implement implementation schemas representing a series of single query operations which are suitable to implement the desired behavior of the complex data access operations. However, dependent on the database and the complex data access operations which are executed against the database, different implementation schemas for a given complex data access operation can lead to different query operation performances.

For example, assume a complex data access operation representing an update operation that will perform an insert operation if data to update is not already present. The complex data access operation is to be executed 100,000 times against a data repository (e.g., a database) in a data processing system. Furthermore, the complex data access operation is implemented in a corresponding DBMS using single SQL query operations. Assume now that at each execution of the complex data access operation an UPDATE query operation is initially executed for updating the database. Assume further that at each execution of the UPDATE operation the data to be updated is not present in the database. Thus, at each execution of the UPDATE operation a subsequent execution of an INSERT query operation is required to insert the data into the database. Consequently, at each execution of the complex data access operation two single SQL query operations are performed, first an UPDATE operation that fails and then an INSERT operation that completes successfully. This leads to a total of 200,000 single query operations which are performed when executing the complex data access operation 100,000 times against the database. Consequently, this implementation schema introduces significant overhead to the DBMS for managing 100,000 executions of failing UPDATE query operations, including processing of the operations and corresponding return (error) codes.

Therefore, there is a need for an efficient mechanism for implementing complex data access operations. Furthermore, there is a need for an effective mechanism for managing execution of complex data access operations against a data repository in a data processing system.

SUMMARY OF THE INVENTION

The present invention is generally directed to a method, system and article of manufacture for data processing and more particularly for managing execution of complex data access operations in a data processing system.

One embodiment provides a method of managing execution of query operations in a data processing system, comprising issuing, by a requesting entity, a request to perform a composite query operation defining an initial query operation and a subsequent query operation to be executed against a data repository of the data processing system, executing the initial query operation, determining an operation status of the initial query operation, and managing execution of the subsequent query operation on the basis of the determined operation status.

Another embodiment provides a method of managing execution of query operations in a data processing system, comprising issuing, by a requesting entity, a request to perform a composite query operation defining an initial query operation and a plurality of subsequent query operations to be executed against a data repository of the data processing system, providing selection logic defining a next query operation of the composite query operation to be executed, providing a plurality of failure conditions for determining when a failure of the composite query operation occurs, and managing, using a composite query operations manager, execution of the initial query operation and the plurality of subsequent query operations on the basis of the selection logic and the plurality of failure conditions.

Still another embodiment provides a method of managing execution of query operations in a data processing system, comprising providing a composite query operation to be executed against a data repository of the data processing system, providing at least two implementation schemas for the composite query operation, each defining a different order of execution of at least two different query operations required to perform the composite query operation, executing the composite query operation according to a first implementation schema of the implementation schemas, determining, upon completion of the execution of the composite query operation, a completion status of the composite query operation, and managing a subsequent execution of the composite query operation on the basis of the determined completion status.

Still another embodiment provides a method of managing execution of query operations in a data processing system, comprising: (a) providing a composite query operation defining a first and a second query operation to be executed against a data repository of the data processing system, (b) providing a first and a second implementation schema for the composite query operation, each defining a different order of execution of the first and the second query operation, (c) selecting an implementation schema of the first and second implementations schemas, (d) initializing a failure count, (e) repeatedly executing the composite query operation according to the selected implementation schema in response to subsequent requests for execution of the composite query operation according to the selected implementation schema, and (f) upon each execution of the composite query operation according to the selected implementation schema: (f1) determining a completion status of the composite query operation indicating a number of query operations executed as part of the composite query operation, (f2) incrementing the failure count if the number of query operations indicated by the completion status exceeds a first predetermined threshold, (f3) determining whether the failure count exceeds a second predetermined threshold, and (f4) if the failure count exceeds the second predetermined threshold: (i) resetting the failure count, (ii) selecting the other implementation schema, and (iii) returning to step (e).

Still another embodiment provides a computer readable medium containing a program which, when executed, performs a process of managing execution of query operations in a data processing system, the process comprising receiving, from a requesting entity, a request to perform a composite query operation defining an initial query operation and a subsequent query operation to be executed against a data repository of the data processing system, executing the initial query operation, determining an operation status of the initial query operation, and managing execution of the subsequent query operation on the basis of the determined operation status.

Still another embodiment provides a computer readable medium containing a program which, when executed, performs a process of managing execution of query operations in a data processing system, the process comprising receiving, from a requesting entity, a request to perform a composite query operation defining an initial query operation and a plurality of subsequent query operations to be executed against a data repository of the data processing system, retrieving selection logic defining a next query operation of the composite query operation to be executed, retrieving a plurality of failure conditions for determining when a failure of the composite query operation occurs, and managing, using a composite query operations manager, execution of the initial query operation and the plurality of subsequent query operations on the basis of the selection logic and the plurality of failure conditions.

Still another embodiment provides a computer readable medium containing a program which, when executed, performs a process of managing execution of query operations in a data processing system, the process comprising receiving a request to perform a composite query operation against a data repository of the data processing system, providing at least two implementation schemas for the composite query operation, each defining a different order of execution of at least two different query operations required to perform the composite query operation, executing the composite query operation according to a first implementation schema of the implementation schemas, determining, upon completion of the execution of the composite query operation, a completion status of the composite query operation, and managing a subsequent execution of the composite query operation on the basis of the determined completion status.

Still another embodiment provides a computer readable medium containing a program which, when executed, performs a process of managing execution of query operations in a data processing system, the process comprising: (a) receiving a request to perform a composite query operation defining a first and a second query operation to be executed against a data repository of the data processing system, (b) retrieving a first and a second implementation schema for the composite query operation, each defining a different order of execution of the first and the second query operation, (c) selecting an implementation schema of the first and second implementations schemas, (d) initializing a failure count, (e) repeatedly executing the composite query operation according to the selected implementation schema in response to subsequent requests for execution of the composite query operation according to the selected implementation schema, and (f) upon each execution of the composite query operation according to the selected implementation schema: (f1) determining a completion status of the composite query operation indicating a number of query operations executed as part of the composite query operation, (f2) incrementing the failure count if the number of query operations indicated by the completion status exceeds a first predetermined threshold, (f3) determining whether the failure count exceeds a second predetermined threshold, and (f4) if the failure count exceeds the second predetermined threshold: (i) resetting the failure count, (ii) selecting the other implementation schema, and (iii) returning to step (e).

Still another embodiment provides a data processing system comprising a data repository, and a composite query operations manager residing in memory for managing execution of query operations in the data processing system, the composite query operations manager being configured for receiving a request to perform a composite query operation defining an initial query operation and a subsequent query operation to be executed against the data repository, executing the initial query operation, determining an operation status of the initial query operation, and managing execution of the subsequent query operation on the basis of the determined operation status.

Still another embodiment provides a data processing system comprising a data repository, and a composite query operations manager residing in memory for managing execution of query operations in the data processing system, the composite query operations manager being configured for receiving a request to perform a composite query operation defining an initial query operation and a plurality of subsequent query operations to be executed against the data repository, retrieving selection logic defining a next query operation of the composite query operation to be executed, retrieving a plurality of failure conditions for determining when a failure of the composite query operation occurs, and managing execution of the initial query operation and the plurality of subsequent query operations on the basis of the selection logic and the plurality of failure conditions.

Still another embodiment provides a data processing system comprising a data repository, and a composite query operations manager residing in memory for managing execution of query operations in the data processing system, the composite query operations manager being configured for receiving a request to perform a composite query operation against a data repository of the data processing system, providing at least two implementation schemas for the composite query operation, each defining a different order of execution of at least two different query operations required to perform the composite query operation, executing the composite query operation according to a first implementation schema of the implementation schemas, determining, upon completion of the execution of the composite query operation, a completion status of the composite query operation, and managing a subsequent execution of the composite query operation on the basis of the determined completion status.

Still another embodiment provides a data processing system comprising a data repository, and a composite query operations manager residing in memory for managing execution of query operations in the data processing system, the composite query operations manager being configured for: (a) receiving a request to perform a composite query operation defining a first and a second query operation to be executed against the data repository, (b) retrieving a first and a second implementation schema for the composite query operation, each defining a different order of execution of the first and the second query operation, (c) selecting an implementation schema of the first and second implementations schemas, (d) initializing a failure count, (e) repeatedly executing the composite query operation according to the selected implementation schema in response to subsequent requests for execution of the composite query operation according to the first implementation schema, and (f) upon each execution of the composite query operation according to the selected implementation schema: (f1) determining a completion status of the composite query operation indicating a number of query operations executed as part of the composite query operation, (f2) incrementing the failure count if the number of query operations indicated by the completion status exceeds a first predetermined threshold, (f3) determining whether the failure count exceeds a second predetermined threshold, and (f4) if the failure count exceeds the second predetermined threshold: (i) resetting the failure count, (ii) selecting the other implementation schema, and (iii) returning to step (e).

Still another embodiment provides a data structure residing in memory, comprising at least one composite query operation component including a plurality of query operations adapted for defining a composite query operation to be executed against a data repository of a data processing system, selection logic defining a next query operation of the composite query operation to be executed, and a plurality of failure conditions for determining when a failure of the composite query operation occurs, and at least two implementation schemas for the composite query operation, each defining a different order of execution of at least two different query operations required to perform the composite query operation.

BRIEF DESCRIPTION OF THE DRAWINGS

So that the manner in which the above recited features of the present invention are attained can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
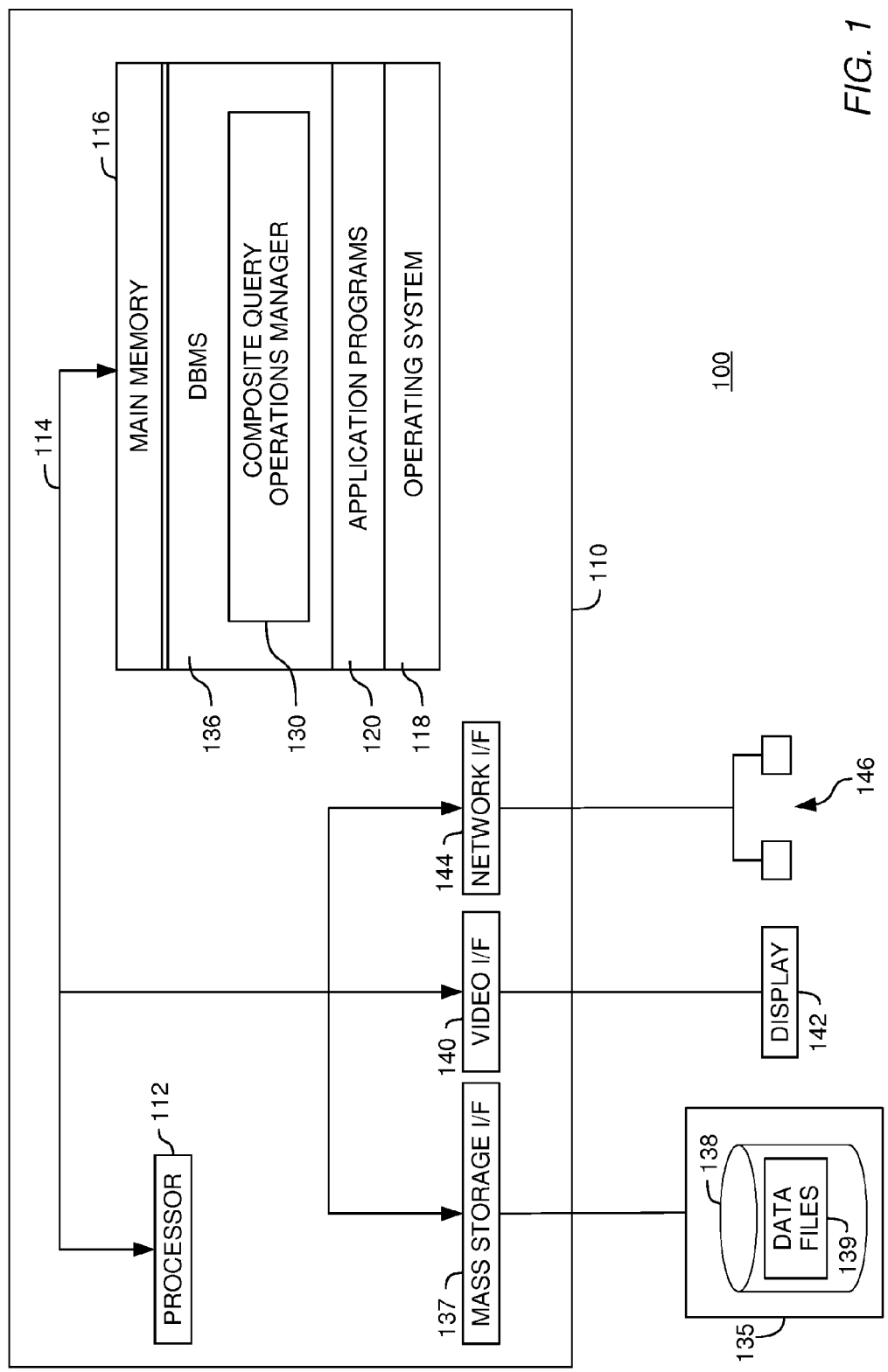
FIG. 1 is a computer system illustratively utilized in accordance with the invention.

The present invention is generally directed to a system, method and article of manufacture for data processing and, more particularly, for managing execution of complex data access operations in a data processing system. In general, a complex data access operation represents a multi-step operation and consists of two or more single data access operations. According to one aspect, a complex data access operation can be represented such that a requesting entity is presented with a single data access operation view of the corresponding multi-step operation. As a result for the requesting entity, issuing complex data access operations becomes as simple as issuing single data access operations. Furthermore, such a representation of complex data access operations is extensible to allow new and future complex data access operations to be represented in the same manner.

In one embodiment, a complex data access operation is implemented as a composite query operation, which appears as a single query operation to a requesting entity requesting it. However, the composite query operation is effectively composed of a sequence of single query operations implemented in an order described by one or more encapsulated implementation schemas. In one embodiment, each implementation schema can be represented as a finite state model. Like a single query operation, a composite query operation takes as input a set of fields and values to apply to an underlying data repository and a series of conditions to govern what portions of the data repository are processed by the composite query operation. Thus, rather than having the requesting entity issue a sequence of fine-grained single query operations connected by appropriate selection logic, the requesting entity can now issue one composite query operation where the appropriate selection logic is already encapsulated within.

Moreover, in one embodiment, an efficient mechanism for managing a repeated execution of composite query operations is provided. Frequently, in response to subsequent requests for execution, a composite query operation is repeatedly executed against a data repository. For instance, in gene sequencing, execution of a complex UPDATE/INSERT query operation (i.e., an operation that will first attempt an update operation and then perform an insert operation if the data to update is not already present) can be required more than 100,000 times. For simplicity, the UPDATE/INSERT query operation is hereinafter referred to as an UPSERT operation. In one embodiment, an implementation schema is initially selected for the UPSERT operation. By way of example, if it can be assumed (or predetermined) that the UPSERT operation would change values of existing data in the data repository, an implementation schema defining that an UPDATE query operation is to be executed first is selected. If, upon a given number of executions of the UPSERT operation, it is determined that the UPDATE query operation often fails, another implementation schema is selected for executing the UPSERT operation. More specifically, if the selected UPDATE operation often fails, it is assumed that the UPSERT operation more frequently inserts data into the data repository. Consequently, an implementation schema defining that an INSERT operation is to be executed first is selected. Thus, execution of the UPSERT operation can be managed and optimized in an autonomic manner without a need for user intervention.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, various embodiments of the invention provide numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Referring now to FIG. 1, a computing environment 100 is shown. In general, the distributed environment 100 includes a data processing system 110, interchangeably referred to as the computer system 110, and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries computer available from International Business Machines of Armonk, N.Y.

Illustratively, the computer system 110 comprises a networked system. However, the computer system 110 may also comprise a standalone device. In any case, it is understood that FIG. 1 is merely one possible configuration for a computer system. Embodiments of the invention can apply to any comparable configuration, regardless of whether the computer system 110 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 135, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110 or in the computing environment 100, for example, any storage capacity used as virtual memory or stored on a mass storage device (e.g., direct access storage device 135) or on another computer coupled to the computer system 110 via bus 114.

The memory 116 is shown configured with an operating system 118. The operating system 118 is the software used for managing the operation of the computer system 110. Examples of the operating system 118 include IBM OS/400®, UNIX, Microsoft Windows®, and the like.

The memory 116 further includes one or more application programs 120 and a database management system (DBMS) 136. In one embodiment, the applications 120 (and more generally, any requesting entity, including the operating system 118 and, at the highest level, users) issue queries against one or more databases 138 (for simplicity, only one database is shown). More specifically, the applications 120 issue queries against one or more data files 139 stored in the database 138. It should be noted that the database 138 merely represents a specific implementation of the invention in one embodiment. However, any collection of data regardless of the particular physical representation is contemplated. By way of illustration, instead of being organized according to, for instance, a relational schema accessible by SQL queries, the database may be organized according to an XML schema accessible by XML queries. Thus, the invention is not limited to a particular schema and contemplates extension to schemas presently unknown. As used herein, the term "schema" generically refers to a particular arrangement of data.

Illustratively, the database 138 is stored in the direct access storage device 135. However, it should be appreciated that the database 138 can be stored in any other suitable storage means, including a remote storage device or the main memory 116. In the latter case, the database 138 could be part of the DBMS 136.

The DBMS 136 includes a composite query operations manager 130. In one embodiment, the composite query operations manager 130 is configured to identify basic query operations that may be executed as part of a composite query operation as well as selection logic which defines an order in which the basic query operations are to be executed. The composite query operations manager 130 and the application programs 120 are software products comprising a plurality of instructions that are resident at various times in various memory and storage devices in the computing environment 100. When read and executed by one or more processors 112 in the computer system 110, the application programs 120 and the composite query operations manager 130 cause the computer system 110 to perform the steps necessary to execute steps or elements embodying the various aspects of the invention.

Figure 2:
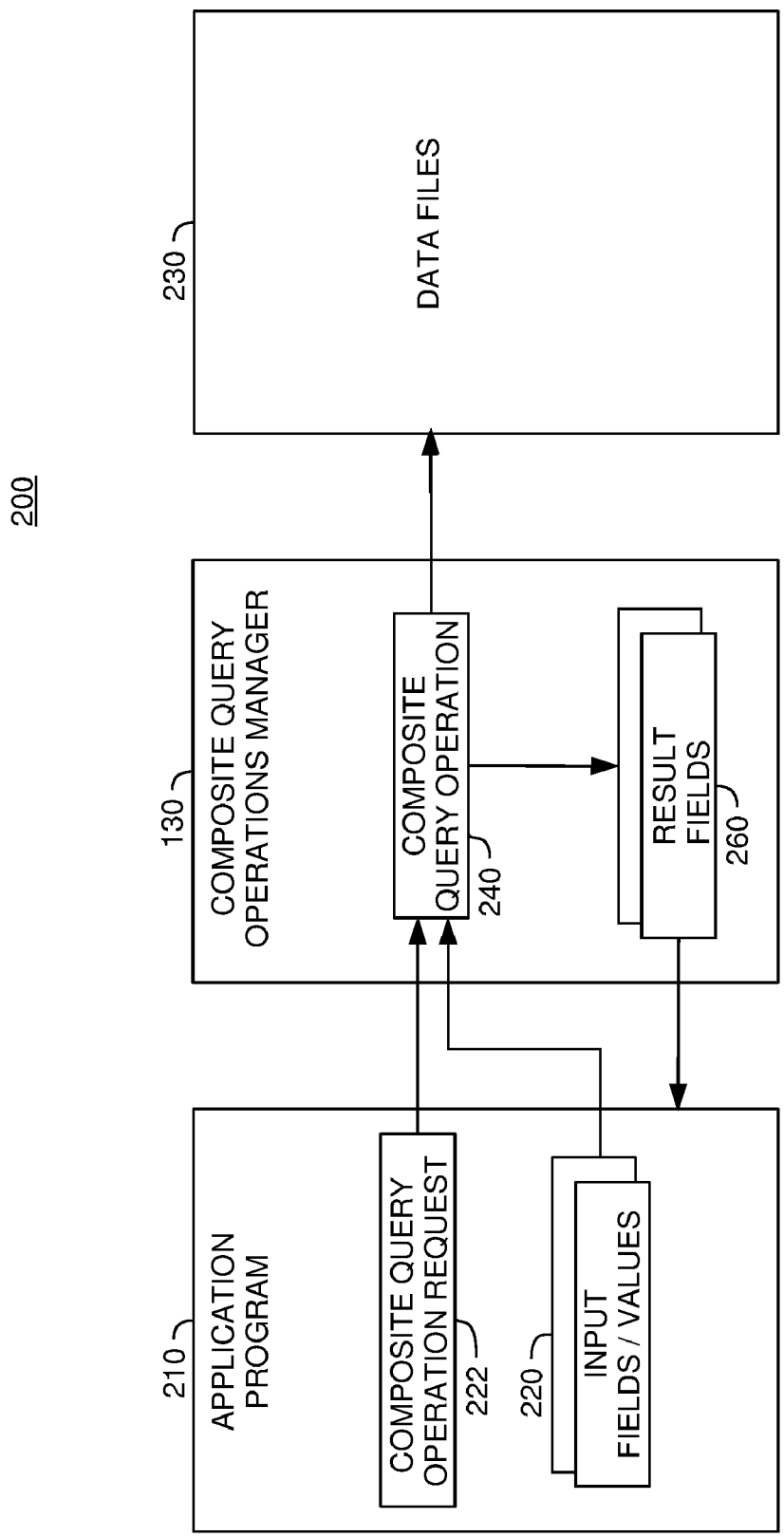
FIG. 2 is a relational view of components implementing the invention.

FIG. 2 shows an illustrative relational view 200 of the composite query operations manager 130 and other components of the invention. In one embodiment, the composite query operations manager 130 defines and manages a composite query operation 240. More specifically, according to one aspect the composite query operations manager 130 provides for an efficient implementation of the composite query operation 240. According to another aspect, the composite query operations manager 130 is configured for effectively managing execution of the composite query operation 240 against a data repository (e.g., data files 139 of FIG. 1) in a data processing system (e.g., data processing system 110 of FIG. 1).

Illustratively, the composite query operations manager 130 receives a composite query operation request 222. By way of example, the composite query operation request 222 is issued from an application program 210 (e.g., one of the application programs 120 of FIG. 1) against one or more data files 230 (e.g., data files 139 of FIG. 1). The composite query operations manager 130 determines a composite query operation 240 to be executed against the data files 230 according to the composite query operation request 222. The data files 230 exemplify a suitable data repository, such as a hierarchical, relational, distributed or object-oriented programming database. According to one aspect, the data repository can be implemented as part of a conventional DBMS and used in financial, enterprise resource planning (ERP), life sciences and various other vertical markets.

The composite query operations manager 130 executes the composite query operation 240 against the data files 230. The composite query operation 240 takes as input a set of field/value pairs 220. By way of example, if the composite query operation 240 is an UPSERT operation, the set of input fields/values 220 is used to update corresponding fields/values in the data files 230, if such corresponding fields/values exist. If no corresponding fields/values exist, the input fields/values 220 are inserted into the data files 230.

In one embodiment, the composite query operations manager 130 returns a set of result fields 260 to the application program 210. The result fields 260 are generated during execution of the composite query operation 240. For instance, composite query operations which, e.g., result in selection of data, may support return of result fields. However, it should be noted that result fields 260 would not be returned by all types of composite query operations. For instance, for composite query operations that result in an effective insert or update of information no result fields are generated.

Figure 3:
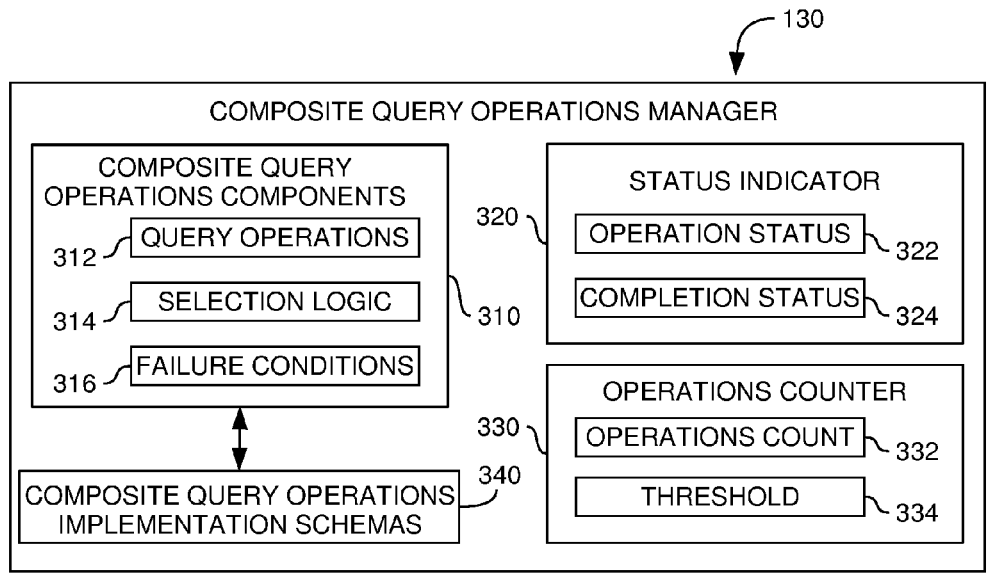
FIG. 3 is a block diagram illustrating a composite query operations manager in one embodiment.

Referring now to FIG. 3, the composite query operations manager 130 is described in more detail. Illustratively, the composite query operations manager 130 includes composite query operations components 310, a status indicator 320, an operations counter 330 and composite query operations implementation schemas 340. The composite query operations components 310, the status indicator 320, the operations counter 330 and the composite query operations implementation schemas 340 implement constituent functions of the composite query operations manager 130. The constituent functions are described in more detail in the following.

The composite query operations components 310 illustratively include query operations 312, selection logic 314 and failure conditions 316. In one embodiment, the query operations 312 include a plurality of single or basic query operations which are executable against a data repository (e.g., data files 230 of FIG. 2). In one embodiment, the query operations 312 are basic SQL query operations. Accordingly, the query operations 312 include a SELECT, INSERT, UPDATE and DELETE operation. If another high-level query language is chosen, such as XML Query, the query operations 312 can include basic query operations of this other query language. Consequently, the query operations 312 are not limited to a specific query language. Instead any known and unknown query language is contemplated.

Two or more query operations 312 can be logically combined to define a composite query operation. For instance, an UPDATE and an INSERT query operation can be logically combined to define an UPSERT composite query operation. However, it should be noted that frequently different basic query operations can be combined to obtain a same composite query operation.

As a composite query operation represents a multi-step operation, the selection logic 314 is adapted to define a next step of the composite query operation to be performed. More specifically, the selection logic 314 may define as a next step a next query operation to be executed or an error state. If the next step is an error state, it may be assumed that execution of the composite query operation has failed and, accordingly, a failure code can be returned. In one embodiment, the selection logic 314 defines a query operation of the query operations 312 as the next query operation. The next query operation can be defined using the status indicator 320. The status indicator 320 indicates a completion status 324 of the composite query operation and an operation status 322 for each executed single query operation of the composite query operation. More specifically, the next query operation can be defined based on the operation status 322 of a previous query operation and one of the failure conditions 316.

The operation status 322 indicates whether an associated basic query operation completed successfully. The operation status 322 can be determined using return codes issued by a corresponding DBMS. For instance, in an SQL environment the DBMS returns a return code message (referred to as the return code) having a message identifier that consists of a prefix (SQL) and a message number for each executed operation or statement in a data processing system. There are three return code types: notification, warning, and critical. Accordingly, message identifiers ending with an N are notification or informational return codes. Those ending with a W indicate warning or instructional return codes. Warning or instructional return codes are generally indicative of a successful completion of a query. However, such codes suggest that continued operation under identical condition(s) may result in a critical error. Message identifiers ending with a C indicate critical system error return codes. For instance, for an executed SELECT statement the return code may be an "SQL0000W" return code which indicates that the SELECT statement executed successfully. Another possible return code for the SELECT statement is an "SQL0100W" return code which indicates that the result of the statement is an empty table. In this case it may be assumed that the SELECT statement failed. In other words, the return codes are indicators of the performance of the data processing system.

Furthermore, other information can be used to determine the operation status 322. For instance, the operation status 322 can be determined according to a number of items affected by the associated basic query operation. For example, for a SELECT operation a number of selected rows can be determined, for an INSERT operation a number of inserted rows can be determined and for an UPDATE operation a number of updated rows can be determined.

In one embodiment, an overall operation status can be determined for a given composite query operation on the basis of a combination of a return code and the other information. For example, assume an UPSERT composite query operation having an UPDATE query operation as the first basic operation, followed by an INSERT query operation if the UPDATE operation fails. For instance with IBM's DB2, if an UPDATE query operation is executed against a row that does not exist, a successful return code is returned from the operation. However, as no row could be updated, an updated row count of 0 is returned as the other information. Thus, an overall operation status can be determined which indicates that the UPDATE operation failed. Accordingly, the selection logic 314 involved in determining whether to execute the subsequent INSERT operation can be something like (Return Code=0 AND Update Count=0), thereby indicating that the INSERT query operation should be executed.

In one embodiment, the completion status 324 is determined on the basis of return codes issued by the DBMS. The completion status 324 indicates whether the composite query operation completed successfully. Accordingly, the completion status 324 of the composite query operation may represent a success code or a failure code. More specifically, each one of the failure conditions 316 describes one or more conditions which indicate a failure of the composite query operation. Thus, the failure conditions 316 are used for determining when a failure of the composite query operation occurs. When failure occurs, a failure code is returned. The failure code may indicate the corresponding failure condition which determines the failure.

The composite query operations implementation schemas 340 (hereinafter referred to as implementation schemas 340) are associated with corresponding composite query operations. Each implementation schema 340 implements an associated composite query operation as a multi-step operation. More specifically, each implementation schema 340 identifies a series of components from the composite query operations components 310 to define an implementation of a composite query operation. Thus, different implementations schemas having different components from the composite query operations components 310 can be provided for a given composite query operation. In one embodiment, an implementation schema 340 defines a series of components having at least one query operation of the query operations 312 composing the associated composite query operation. For instance, assume a common, abstract composite query operation such as an UPSERT operation that is mapped to multiple query operations for some DBMS implementations and that maps to a single query operation for a DBMS which implements an atomic or basic UPSERT operation.

In one embodiment, using the selection logic 314, each implementation schema 340 defines transitions between two or more query operations. Furthermore, each implementation schema 340 defines one or more error states of the associated composite query operation. In one embodiment, if one of the two or more query operations of the composite query operation produces an operation status 322 which fulfills one of the failure conditions 316, it is assumed that the composite query operation reached an error state. Consequently, a failure code is issued and execution of the composite query operation is aborted.

An exemplary implementation schema is described in more detail below with reference to FIG. 4. Again, it should be noted that different implementation schemas 340 having different query operations may define a same composite query operation. By way of example, the implementation schemas 340 are shown separate from the composite query operations components 310. However, in one embodiment the implementation schemas 340 may reference or encapsulate one or more composite query operations components 310 for a given composite query operation.

The operations counter 330 illustratively includes an operations count 332 and a threshold 334. In one embodiment, the operations count 332 provides an accumulated number of query operations which have been executed during execution of a composite query operation according to a specific implementation schema. If the accumulated number exceeds the threshold 334, another implementation schema implementing the composite query operation is selected. For instance, assume a composite query operation that is composed of five basic query operations. The composite query operation is executed against a data repository using a particular implementation schema. During execution, the number of basic query operations executed against the data repository in order to perform the composite query operation is counted. Each time a next basic query operation is executed, the accumulated number is incremented by one. If upon completion of the composite query operation the accumulated number is, for instance, five, this indicates that all the basic query operations defining the composite query operation have been executed to perform the composite query operation. Accordingly, it may be assumed that execution of the composite query operation according to a different implementation schema may require fewer executions of basic query operations. Thus, execution of the composite query operation according to the different implementation schema could be suitable to optimize execution and resource use of the composite query operation.

In another embodiment, the composite query operation is repeatedly executed according to the specific implementation schema. For instance, the repeated execution can occur in response to subsequent requests for execution of the composite query operation according to the specific implementation schema. In this case, the accumulated number of query operations may indicate a count of basic query operations which have been executed during two or more executions of the composite query operation. Accordingly, the accumulated number can be incremented each time a query operation is executed as part of the composite query operation. Alternatively, a completion status issued upon each execution of the composite query operation may indicate the number of executed basic query operations Thus, upon each execution of the composite query operation the accumulated number can be incremented on the basis of the completion status.

In another embodiment, when the composite query operation is repeatedly executed according to the specific implementation schema, the operations count 332 may implement a failure count. Accordingly, upon each execution of the composite query operation according to the specific implementation schema, a completion status of the composite query operation is determined. The completion status indicates the number of basic query operations executed as part of the composite query operation. If the number of basic query operations indicated by the completion status exceeds a first predetermined threshold, the failure count is incremented by one. If the failure count exceeds a second predetermined threshold, it can be assumed that the composite query operation should be executed according to a different implementation schema.

The threshold 334 can accordingly be implemented as a single threshold value, a floating threshold value dependent on a number of performed executions of an associated composite query operation, or as a pair of threshold values. The threshold 334 can be application-specific or user-specific. Furthermore, the threshold 334 can be a dynamic threshold which is adjustable according to user requests or system requirements. Specifically, the threshold 334 can be adjusted in an autonomic manner by a data processing system according to system parameters, such as CPU or memory use.

In another embodiment, when the composite query operation is repeatedly executed according to the specific implementation schema, the operations count 332 may implement a resource or time accumulator. For instance, assume a case where execution of a plurality of basic query operations defining the composite query operation according to the specific implementation schema requires an amount of time or resources which is less than for another implementation schema that requires fewer, but more expensive basic query operations. In this case, an accumulated resource or time factor can be compared to a given threshold in order to determine whether the specific implementation schema is appropriate for execution of the composite query operation.

In one embodiment, the operations counter 330 represents a schema optimizer and includes a plurality of separate elements configured to support the different functions of the operations count 332 as described above and other desired functions. In other words, the schema optimizer may include one or more components implementing at least one of an operations count, a resource accumulator, an elapsed time accumulator and an optimization logic component. These components are respectively adapted to factor in a number of query operations, an amount of resources consumed and an elapsed time used for each execution of a composite query operation according to a given implementation schema in order to determine whether another implementation schema may be more optimal based on all of these factors. Furthermore, in one embodiment a correlation between operations count and resource consumption/elapsed time can be considered.

Figure 4:
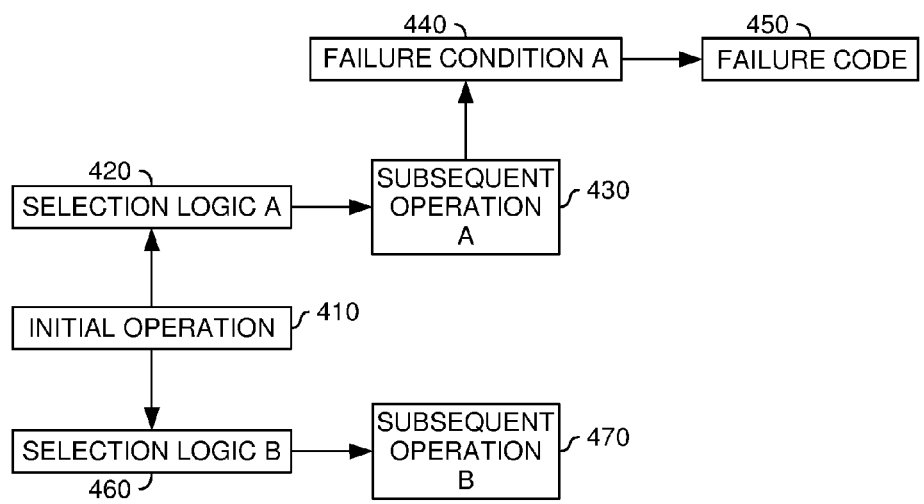
FIG. 4 is a block diagram illustrating an implementation schema in one embodiment.

Referring now to FIG. 4, a data structure 400 is shown which illustrates an embodiment of an implementation schema (e.g., one of the implementation schemas 340 of FIG. 3) of a composite query operation. In one embodiment, the data structure 400 defines a finite state model for implementing the composite query operation. The finite state model defines an initial query operation 410 to attempt, subsequent query operations 430 and 470 that may be executed, selection logic 420 and 460 dictating which query operation to execute based on an operation status of a prior query operation and an error state 450 which identifies a scenario where the composite query operation is assumed to have failed. The internal implementation of the finite state model is hidden from a requesting entity. All the requesting entity "sees" in response to invocation of a composite query operation is a completion status (successful completion or error state) and an optional set of result fields. More specifically, in this particular type of model, a state that is reached for which there is no "next state" is assumed to be a final state. Final states that are non-error states are assumed to represent successful completion of the composite query operation.

More specifically, the data structure 400 includes the initial query operation 410, the subsequent query operation "A" 430 and the subsequent query operation "B" 470. The selection logic "A" 420 indicates when the subsequent operation "A" 430 is to be executed after execution of the initial operation 410, on the basis of an operation status of the initial operation 410. Similarly, the selection logic "B" 460 indicates when the subsequent operation "B" 470 is to be executed. A failure condition "A" 440 indicates, when a failure of the composite query operation is assumed, on the basis of an operation status of the subsequent operation "A" 430. If failure occurs according to the failure condition "A" 440, the failure code 450 indicating an error state is returned.

An exemplary implementation schema is illustrated in Table I below. By way of example, Table I illustrates an algorithm representing an implementation schema of an UPSERT composite query operation.

TABLE I

EXEMPLARY IMPLEMENTATION SCHEMA ALGORITHM

```
001 ImplementationSchema1:
002 doInsert
003 if (failed) {
004     doUpdate
005     if (failed) {
006         return (failureCode)
007     }
008 }
```

Execution of the UPSERT composite query operation according to the exemplary implementation schema of Table I starts with execution of an INSERT query operation (line 002). If the INSERT query operation fails (line 003), an UPDATE query operation is executed (line 004). If the UPDATE query operation fails (line 005), it is assumed that the UPSERT composite query operation has failed and, therefore, a failure code indicating an error state is returned (line 006). If, to the contrary, one of the INSERT and UPDATE query operations completes successfully, it is assumed that the UPSERT composite query operation completed successfully.

Using the INSERT and UPDATE query operations, another implementation schema implementing the UPSERT composite query operation can be created. Illustratively, an algorithm representing another implementation schema of the UPSERT composite query operation is shown in Table II below.

TABLE II

EXEMPLARY IMPLEMENTATION SCHEMA ALGORITHM

```
001 ImplementationSchema2:
002 doUpdate
003 if (failed) {
004     doInsert
005     if (failed) {
006         return (failureCode)
007     }
008 }
```

By way of example, execution of the UPSERT composite query operation according to the exemplary implementation schema of Table II starts with an UPDATE query operation (line 002).

Figure 5A:
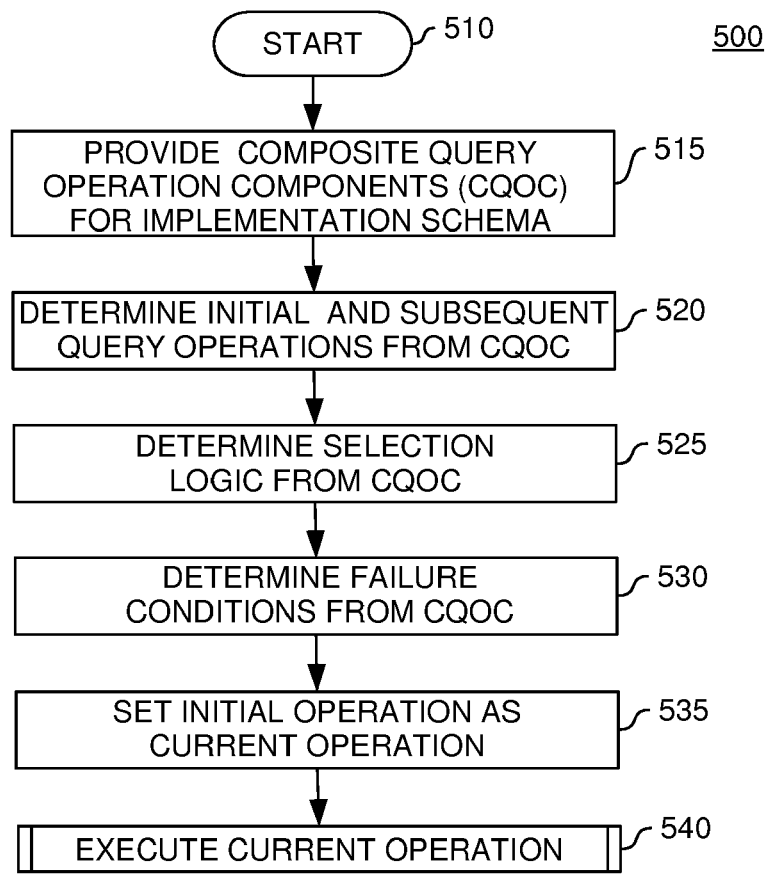
FIGS. 5A and 5B are flow charts illustrating composite query operation execution management in one embodiment.
Figure 5B:
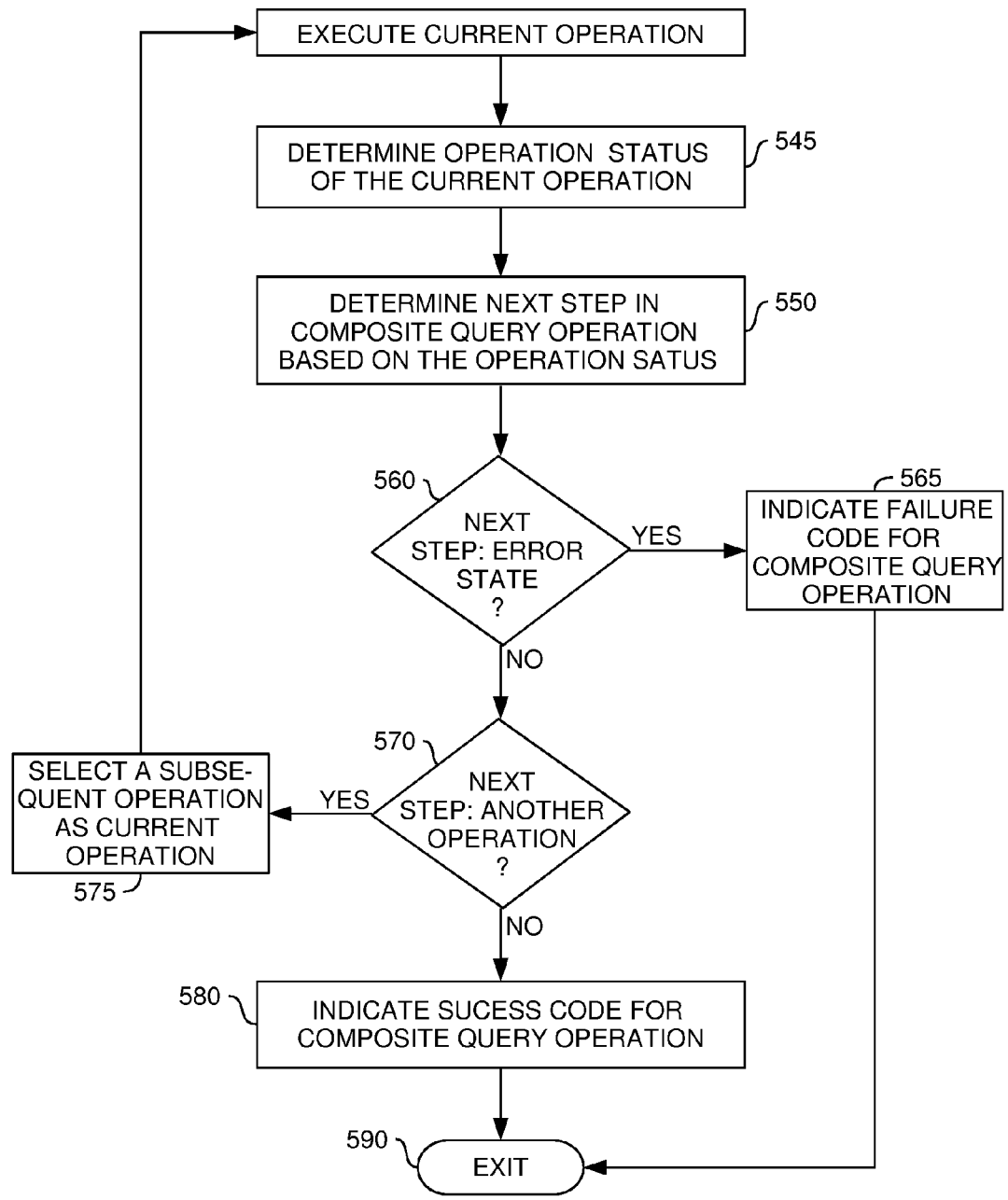

Referring now to FIGS. 5A and 5B, an illustrative method 500 is shown that represents a sequence of operations as performed by a composite query operations manager (e.g., composite query operations manager 130 of FIG. 1) in one embodiment. More specifically, the sequence of operations is performed with respect to a composite query operation (e.g., composite query operation 240 of FIG. 2) issued by an application (e.g., application 210 of FIG. 2) against a data repository (e.g., data files 230 of FIG. 2) in a data processing system (e.g., data processing system 110 of FIG. 1).

Method 500 is entered at step 510 when the composite query operations manager receives a composite query operation request for execution of a composite query operation. In step 515, composite query operation components (hereinafter referred to as the composite components) defining the composite query operation are provided. In one embodiment, the composite components are retrieved from memory (e.g., from the composite query operations components 310 of FIG. 3).

In steps 520 to 530, an implementation schema implementing the composite query operation is determined. The implementation schema describes a multi-step operation defined by initial and subsequent query operations, selection logic and failure conditions. To this end, basic query operations (e.g., query operations 312 of FIG. 3) defining the composite query operation are determined in step 520. More specifically, initial and subsequent query operations are determined from the composite components. In step 525, selection logic (e.g., selection logic 314 of FIG. 3) is determined from the composite components. In step 530, failure conditions (e.g., failure conditions 316 of FIG. 3) are determined from the composite components.

Execution of the composite query operation according to the determined implementation schema starts at step 535. In step 535, the determined initial query operation is set as a current operation. In step 540, the current operation is executed against the data repository. In step 545, an operation status of the current operation is determined.

In step 550, a next step of the multi-step operation is determined. The next step to be performed as part of the composite query operation is determined on the basis of the operation status of the current operation using the determined selection logic and the determined implementation schema. In step 560, it is determined whether the next step is an error state. If the next step is an error state, it is assumed that execution of the composite query operation has failed. Accordingly, a failure code for the composite query operation is indicated in step 565, e.g., as a completion status 324. The method 500 then exits at step 590.

If, however, it is determined at step 560 that the next step is not an error state, it is determined in step 570 whether the next step is another basic query operation. If the next step is not another basic query operation, it is assumed that execution of the composite query operation was successful, since no error state occurred. Accordingly, a success code for the composite query operation is indicated in step 580, e.g., as a completion status. The method 500 then exits at step 590.

If, however, it is determined at step 570 that the next step is another basic query operation, a subsequent operation of the determined subsequent query operations is selected as the current operation in step 575. Processing then returns to step 540. Thus, steps 540, 545, 550, 560, 570 and 575 form a loop which is performed repeatedly until the composite query operation has completed successfully or failed.

Figure 6A:
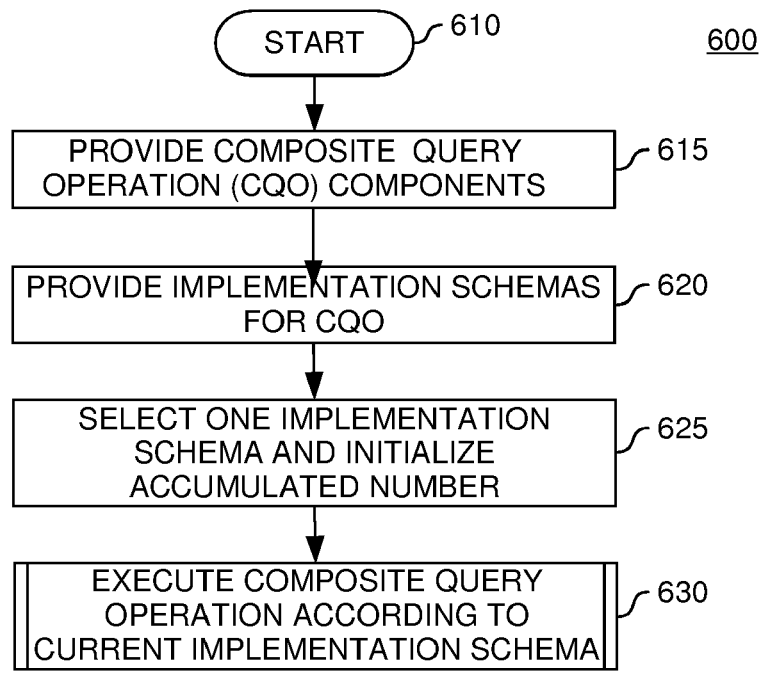
FIGS. 6A and 6B are flow charts illustrating composite query operation execution management in another embodiment.
Figure 6B:
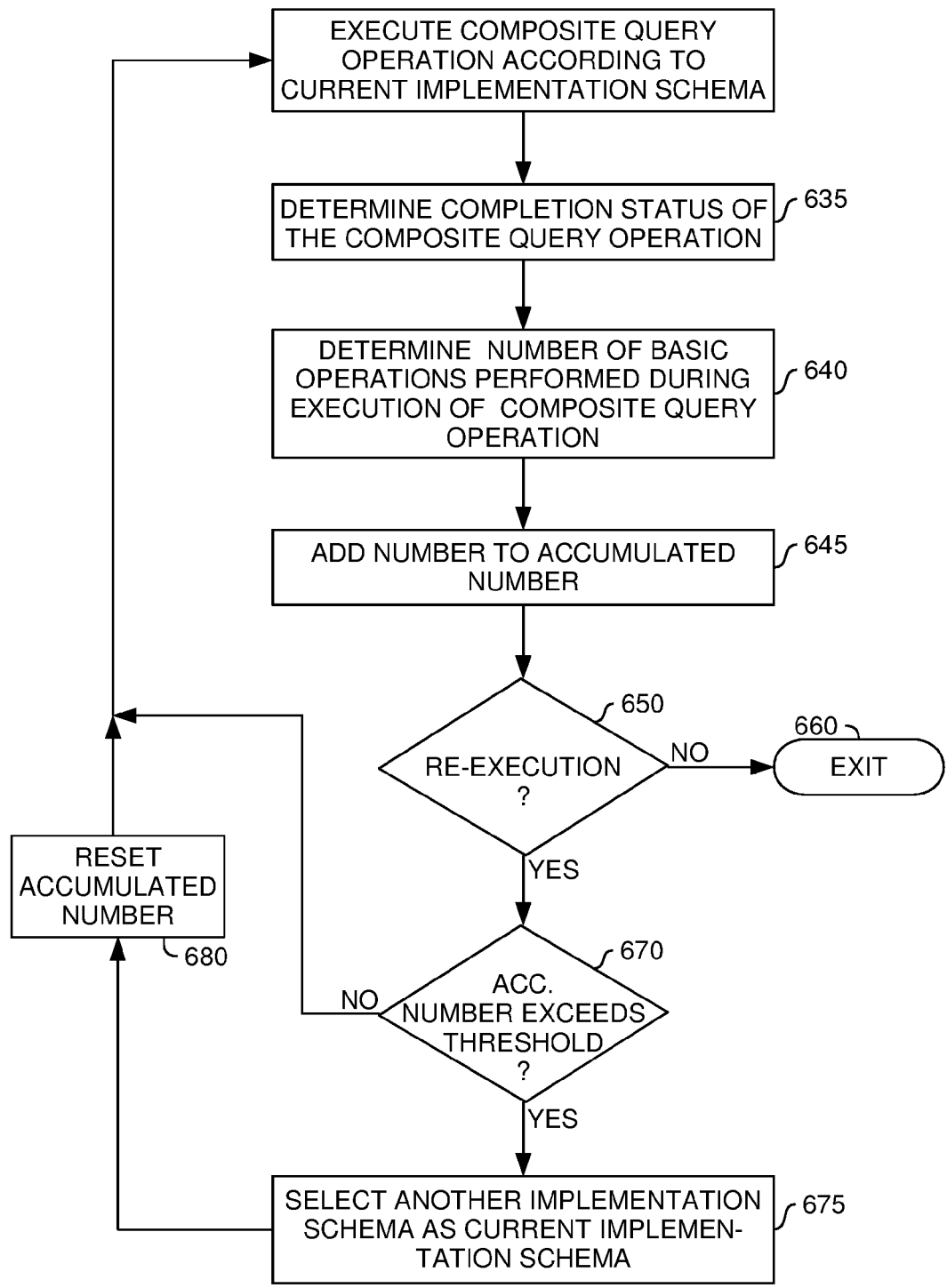

Referring now to FIGS. 6A and 6B, an illustrative method 600 is shown that represents a sequence of operations as performed by a composite query operations manager (e.g., composite query operations manager 130 of FIG. 1) in another embodiment. Method 600 is entered at step 610 when the composite query operations manager receives a composite query operation. In step 615, composite components defining the composite query operation are provided.

In step 620, a plurality of implementation schemas (e.g., implementation schemas 340 of FIG. 3) implementing the composite query operation is provided. In one embodiment, the implementation schemas are retrieved from memory (e.g., from the implementation schemas 340 of FIG. 3). In step 625, an implementation schema of the plurality of provided implementation schemas is selected as a current implementation schema. Furthermore, an accumulated number of query operations is initialized.

In step 630, the composite query operation is executed against a data repository (e.g., data files 230 of FIG. 2) according to the current implementation schema. In step 635, after execution of the composite query operation, a completion status (e.g., completion status 324 of FIG. 3) of the composite query operation is determined. In step 640, a number of query operations which have been executed as part of the composite query operation is determined. The number of query operations indicates a count of all basic query operations which have been performed as part of the composite query operation to achieve completion of the composite query operation. In step 645, the determined number of query operations is added to the accumulated number of query operations.

In step 650, it is determined whether re-execution of the composite query operation according to the current implementation schema is requested. If no re-execution is requested, the method 600 exits at step 660. If, however, a re-execution is requested, it is determined in step 670 whether the accumulated number of query operations exceeds a predetermined threshold (e.g., threshold 334 of FIG. 3). If the accumulated number does not exceed the predetermined threshold, processing returns to step 630.

If, however, the accumulated number of query operations exceeds the predetermined threshold, it is assumed that the current implementation schema does not achieve a desired performance and/or resource use. Therefore, another implementation schema of the plurality of provided implementation schemas is selected as the current implementation schema in step 675. Furthermore, in step 680, the accumulated number of query operations is reset and processing returns to step 630. Thus, steps 630, 635, 640, 645, 650, 670, 675 and 680 form a loop which is continuously performed when a composite query operation is repeatedly executed. On the basis of the predetermined threshold, the loop manages selection of an appropriate implementation schema in an autonomic manner without a need for user interaction. Accordingly, resource use and overall system performance can be optimized, as the current implementation schema is automatically adapted according to its performance.

It should be noted that the flowcharts illustrated in FIGS. 5A, 5B, 6A and 6B intend to exemplify methods of managing execution of query operations in a data processing system. However, modifications to the flowcharts and alternative embodiments, which also provide for an efficient query operations execution management, are readily apparent to the skilled person. For instance, instead of incrementing an accumulated number for a plurality of executions of the same composite query operation and comparing the accumulated number to a predetermined threshold according to steps 645 and 670, for each composite query operation execution the number of query operations can be compared with a threshold. Thus, after each composite query operation execution it can be determined whether the current implementation schema is appropriate or whether another implementation schema should be selected. Furthermore, the accumulated number of query operations can implement a failure count. The failure count is only incremented in step 645, if the number of query operations determined in step 640 exceeds a first predetermined threshold. Thus, in step 670 the failure count can be compared to a second predetermined threshold.

In various embodiments, the invention provides numerous advantages over the prior art. For instance, the above described composite query operations execution management can be conveniently implemented for abstract insert, update and delete operations. Such abstract query operations are described in U.S. patent application Ser. No. 10/403,366, filed on Mar. 31, 2003 entitled "MODIFICATION OF A DATA REPOSITORY BASED ON AN ABSTRACT DATA REPRESENTATION". Furthermore, a mechanism for providing abstract queries was disclosed in commonly assigned U.S. patent application Ser. No. 10/083,075 (the '075 application), filed Feb. 26, 2002 entitled "IMPROVED APPLICATION FLEXIBILITY THROUGH DATABASE SCHEMA AND QUERY ABSTRACTION," which is hereby incorporated herein in its entirety. The mechanism of the '075 application provides a requesting entity (i.e., an end-user or application) with a data abstraction or abstract model of physical data. In this way, the requesting entity is decoupled from the underlying physical data to be accessed. Accordingly, for instance abstract queries based on the abstract model can be constructed without regard for the makeup of the physical data. However, it should be noted that it would also be possible to implement a similar approach on SQL or other query language primitives.

While the foregoing is directed to embodiments of the present invention, other and further embodiments of the invention may be devised without departing from the basic scope thereof, and the scope thereof is determined by the claims that follow.

What is claimed is:

1. A method of managing execution of query operations in a data processing system, comprising:
   providing a composite query operation to be executed against a data repository of the data processing system;
   providing at least two implementation schemas for the composite query operation, each defining a different order of execution of at least two different query operations required to perform the composite query operation;
   executing the composite query operation according to a first implementation schema of the implementation schemas;
   determining, upon completion of the execution of the composite query operation, a completion status of the composite query operation, wherein the completion status indicates a number of query operations executed as part of the composite query operation; and
   managing a subsequent execution of the composite query operation on the basis of the determined completion status, wherein the managing comprises:
   executing the composite query operation according to a second implementation schema of the at least two implementation schemas, if the number of query operations exceeds a predetermined threshold.

2. The method of claim 1, wherein the completion status indicates a number of query operations executed as part of the composite query operation; and wherein the managing comprises:
   initializing a failure count;
   repeatedly executing the composite query operation in response to subsequent requests for execution of the composite query operation according to the first implementation schema; and
   upon each execution of the composite query operation according to the first implementation schema:
   incrementing the failure count if the number of query operations indicated by the completion status exceeds a first predetermined threshold; and
   if the failure count exceeds a second predetermined threshold:
   resetting the failure count; and
   executing the composite query operation according to the second implementation schema of the implementation schemas.

3. The method of claim 1, wherein the completion status indicates a number of query operations executed as part of the composite query operation; and wherein the managing comprises:
   initializing an accumulated number of query operations;
   repeatedly executing the composite query operation in response to subsequent requests for execution of the composite query operation according to the first implementation schema; and
   upon each execution of the composite query operation according to the first implementation schema:
   summing the number of query operations indicated by the completion status to the accumulated number of query operations; and
   if the accumulated number of query operations exceeds a predetermined threshold:
   resetting the accumulated number of query operations; and
   executing the composite query operation according to the second implementation schema of the implementation schemas.

4. The method of claim 1, wherein the first and second query operations are SQL statements.

5. A method of managing execution of query operations in a data processing system, comprising:
- a) providing a composite query operation defining a first and a second query operation to be executed against a data repository of the data processing system;
- b) providing a first and a second implementation schema for the composite query operation, each defining a different order of execution of the first and the second query operation;
- c) selecting an implementation schema of the first and second implementations schemas;
- d) initializing a failure count;
- e) repeatedly executing the composite query operation according to the selected implementation schema in response to subsequent requests for execution of the composite query operation according to the selected implementation schema; and
- f) upon each execution of the composite query operation according to the selected implementation schema:
  - f1) determining a completion status of the composite query operation indicating a number of query operations executed as part of the composite query operation;
  - f2) incrementing the failure count if the number of query operations indicated by the completion status exceeds a first predetermined threshold;
  - f3) determining whether the failure count exceeds a second predetermined threshold; and
  - f4) if the failure count exceeds the second predetermined threshold:
    - i) resetting the failure count;
    - ii) selecting the other implementation schema; and
    - iii) returning to step e).

6. The method of claim 5, wherein the first and second query operations are SQL statements.

7. A computer readable storage medium containing a program which, when executed, performs a process of managing execution of query operations in a data processing system, the process comprising:
- receiving a request to perform a composite query operation against a data repository of the data processing system;
- providing at least two implementation schemas for the composite query operation, each defining a different order of execution of at least two different query operations required to perform the composite query operation;
- executing the composite query operation according to a first implementation schema of the implementation schemas;
- determining, upon completion of the execution of the composite query operation, a completion status of the composite query operation, wherein the completion status indicates a number of query operations executed as part of the composite query operation; and
- managing a subsequent execution of the composite query operation on the basis of the determined completion status, wherein the managing comprises:
  - executing the composite query operation according to a second implementation schema of the at least two implementation schemas, if the number of query operations exceeds a predetermined threshold.

8. The computer readable storage medium of claim 7, wherein the completion status indicates a number of query operations executed as part of the composite query operation; and wherein the managing comprises:
- initializing a failure count;
- repeatedly executing the composite query operation in response to subsequent requests for execution of the composite query operation according to the first implementation schema; and
- upon each execution of the composite query operation according to the first implementation schema:
  - incrementing the failure count if the number of query operations indicated by the completion status exceeds a first predetermined threshold; and
  - if the failure count exceeds a second predetermined threshold:
    - resetting the failure count; and
    - executing the composite query operation according to the second implementation schema of the implementation schemas.

9. The computer readable storage medium of claim 7, wherein the completion status indicates a number of query operations executed as part of the composite query operation; and wherein the managing comprises:
- initializing an accumulated number of query operations;
- repeatedly executing the composite query operation in response to subsequent requests for execution of the composite query operation according to the first implementation schema; and
- upon each execution of the composite query operation according to the first implementation schema:
  - summing the number of query operations indicated by the completion status to the accumulated number of query operations; and
  - if the accumulated number of query operations exceeds a predetermined threshold:
    - resetting the accumulated number of query operations; and
    - executing the composite query operation according to the second implementation schema of the implementation schemas.

10. The computer readable storage medium of claim 7, wherein the first and second query operations are SQL statements.

11. A computer readable storage medium containing a program which, when executed, performs a process of managing execution of query operations in a data processing system, the process comprising:
- a) receiving a request to perform a composite query operation defined by at least a first and a second query operation to be executed against a data repository of the data processing system;
- b) retrieving a first and a second implementation schema for the composite query operation, each defining a different order of execution of the first and the second query operation;
- c) selecting an implementation schema of the first and second implementations schemas;
- d) initializing a failure count;
- e) repeatedly executing the composite query operation according to the selected implementation schema in response to subsequent requests for execution of the composite query operation according to the selected implementation schema; and
- f) upon each execution of the composite query operation according to the selected implementation schema:
  - f1) determining a completion status of the composite query operation indicating a number of query operations executed as part of the composite query operation;

f2) incrementing the failure count if the number of query operations indicated by the completion status exceeds a first predetermined threshold;

f3) determining whether the failure count exceeds a second predetermined threshold; and f4) if the failure count exceeds the second predetermined threshold:
  i) resetting the failure count;
  ii) selecting the other implementation schema; and
  iii) returning to step e).

12. The computer readable storage medium of claim 11, wherein the first and second query operations are SQL statements.

13. A data processing system, comprising:
  a data repository; and
  a composite query operations manager residing in memory for managing execution of query operations in the data processing system, the composite query operations manager being configured for:
    receiving a request to perform a composite query operation against a data repository of the data processing system;
    providing at least two implementation schemas for the composite query operation, each defining a different order of execution of at least two different query operations required to perform the composite query operation;
    executing the composite query operation according to a first implementation schema of the implementation schemas;
    determining, upon completion of the execution of the composite query operation, a completion status of the composite query operation, wherein the completion status indicates a number of query operations executed as part of the composite query operation; and
    managing a subsequent execution of the composite query operation on the basis of the determined completion status, wherein the managing comprises:
      executing the composite query operation according to a second implementation schema of the at least two implementation schemas, if the number of query operations exceeds a predetermined threshold.

14. A data processing system, comprising:
  a data repository; and
  a composite query operations manager residing in memory for managing execution of query operations in the data processing system, the composite query operations manager being configured for:
    a) receiving a request to perform a composite query operation defined by at least a first and a second query operation to be executed against the data repository;
    b) retrieving a first and a second implementation schema for the composite query operation, each defining a different order of execution of the first and the second query operation;
    c) selecting an implementation schema of the first and second implementations schemas;
    d) initializing a failure count;
    e) repeatedly executing the composite query operation according to the selected implementation schema in response to subsequent requests for execution of the composite query operation according to the first implementation schema; and
    f) upon each execution of the composite query operation according to the selected implementation schema:
      f1) determining a completion status of the composite query operation indicating a number of query operations executed as part of the composite query operation;
      f2) incrementing the failure count if the number of query operations indicated by the completion status exceeds a first predetermined threshold;
      f3) determining whether the failure count exceeds a second predetermined threshold; and
      f4) if the failure count exceeds the second predetermined threshold:
        i) resetting the failure count;
        ii) selecting the other implementation schema; and
        iii) returning to step e).

* * * * *